(12) United States Patent
Mohammed et al.

(10) Patent No.: US 11,546,967 B2
(45) Date of Patent: Jan. 3, 2023

(54) DETERMINING A RADIO ACCESS TECHNOLOGY AVAILABILITY INDICATOR TO PRESENT

(71) Applicant: Apple Inc., Cupertino, CA (US)

(72) Inventors: Sofheem Mohammed, Cupertino, CA (US); Rohit Thareja, Cupertino, CA (US); Vijay Venkataraman, San Jose, CA (US); Shivani Suresh Babu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 16/951,877

(22) Filed: Nov. 18, 2020

(65) Prior Publication Data

US 2022/0159783 A1     May 19, 2022

(51) Int. Cl.
*H04W 24/10* (2009.01)
*H04W 88/06* (2009.01)
*H04W 76/27* (2018.01)
*H04W 36/00* (2009.01)

(52) U.S. Cl.
CPC .......... *H04W 88/06* (2013.01); *H04W 24/10* (2013.01); *H04W 36/0083* (2013.01); *H04W 76/27* (2018.02)

(58) Field of Classification Search
CPC . H04W 88/06; H04W 24/10; H04W 36/0083; H04W 76/27
See application file for complete search history.

(56) References Cited

U.S. PATENT DOCUMENTS

| | | | |
|---|---|---|---|
| 2019/0053175 A1 | 2/2019 | Kubota et al. | |
| 2019/0319858 A1 | 10/2019 | Das et al. | |
| 2020/0037387 A1* | 1/2020 | Lee | H04W 36/0069 |
| 2020/0068638 A1 | 2/2020 | Au et al. | |
| 2020/0374958 A1 | 11/2020 | Liu et al. | |
| 2021/0153087 A1* | 5/2021 | Lee | H04W 36/0022 |

* cited by examiner

*Primary Examiner* — Chuong A Ngo
(74) *Attorney, Agent, or Firm* — Kowert, Hood, Munyon, Rankin & Goetzel, P.C.

(57) ABSTRACT

This disclosure relates to techniques for a wireless device to determine a radio access technology availability indicator to present. A wireless device may establish a wireless link with a cellular network via a cell that operates according to a first radio access technology. The wireless device may determine if access to the cellular network is also available via a cell that operates according to a second radio access technology, by configuration by the serving cell or from another stand-alone cell. The wireless device may select a radio access technology availability indicator to present based at least in part on determining if access to the cellular network is also available via a cell that operates according to the second radio access technology.

20 Claims, 4 Drawing Sheets

DETERMINING A RADIO ACCESS TECHNOLOGY AVAILABILITY INDICATOR TO PRESENT

FIELD

The present application relates to wireless communications, and more particularly to systems, apparatuses, and methods for determining a radio access technology availability indicator to present in a wireless device.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is important to reduce power requirements while allowing the UE device to maintain good transmit and receive abilities for improved communications.

Additionally, it may be the case that different wireless communication technologies, and/or different features that may be used within the scope of a single wireless communication technology, may provide different communication characteristics, e.g., with respect to amount of bandwidth available, latency, data cost, and/or any of various other possible characteristics. Such differences could impact user behavior, e.g., to the degree that the user is aware of such differences and which wireless communication technology/technologies and/or features are available. However, given the potential for rapid change in wireless conditions, it may be challenging to accurately determine and indicate such information. Accordingly, improvements in the field are desired.

SUMMARY

Embodiments are presented herein of apparatuses, systems, and methods for determining a radio access technology availability indicator to present in a wireless device.

According to the techniques described herein, a wireless device that is connected to a cellular network via a cell that operates according to a first radio access technology (e.g., LTE) may determine whether access to the network is or could also be available to the wireless device via a second radio access technology (e.g., NR).

Such determination may be based on any of a variety of possible considerations. One possible consideration may include whether the serving cell supports configuration of a non-standalone cell that operates according to the second radio access technology, e.g., based on system information provided by the serving cell.

Another possible consideration may include the likelihood of handover from the serving cell. For example, even if the serving cell supports configuration of a non-standalone cell that operates according to the second radio access technology under good service conditions, if handover is likely, it may be the case that the wireless device is unable to obtain access to the network via the second radio access technology via the serving cell, for example in case handover to a cell that does not support access to the network via the second radio access technology does occur, or simply because a higher likelihood of handover may be associated with a higher likelihood that the serving cell signal strength may be too low to effectively configure access to the network via the second radio access technology for the wireless device.

Still another possible consideration may include whether access to the network via the second radio access technology may be possible via a standalone neighbor cell that operates according to the second radio access technology. For example, if system information indicates that one or more such neighbor cells may be present, and cell measurements for at least one of those cells are sufficient to support access to the network by the wireless device via the second radio access technology, it may be the case that access to the network by the wireless device via the second radio access technology is determined to be available.

Based on the determination of whether access to the network is or could also be available to the wireless device via the second radio access technology, the wireless device may select an indicator of radio access technology availability to present, e.g., via a user interface of the wireless device. For example, if access to the network by the wireless device via the second radio access technology is determined to be available, the wireless device may determine to present an indication that network access via the second radio access technology is available, and may accordingly present such an indicator. If access to the network by the wireless device via the second radio access technology is determined to be unavailable, the wireless device may determine to present an indication that network access via the first radio access technology is available, and may accordingly present such an indicator.

Such techniques may help increase the accuracy of the information provided to wireless device users regarding the currently service type(s) available at their wireless devices. For example, an approach in which determination of a radio access technology availability indicator to present is based solely on whether system information for the serving cell indicates support for configuration of a non-standalone cell that operates according to the second radio access technology may result in an inaccurate and/or ping-ponging determination of whether network access via the second radio access technology is available in a scenario in which a wireless device is operating in stationary conditions where multiple LTE operating bands are deployed, some of which support non-standalone NR operation, and some of which do not support non-standalone NR operation. In contrast, the techniques described herein may result in more accurate and/or consistent determination of whether network access via the second radio access technology is available in such a scenario, among various other possible scenarios.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
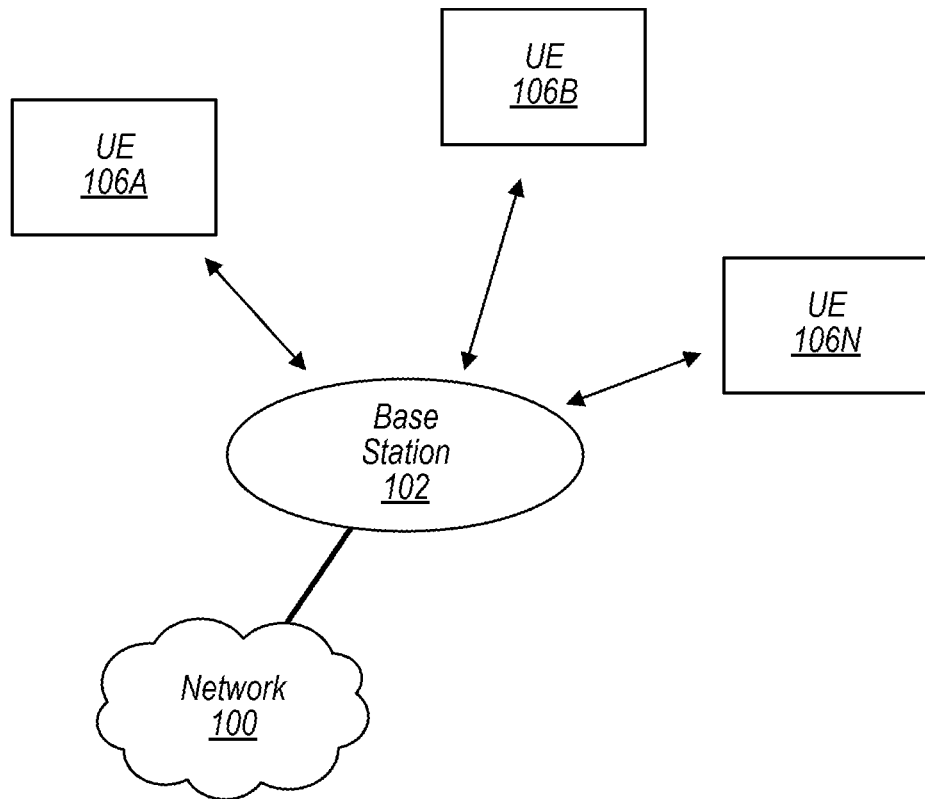
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
RRC: Radio Resource Control
TX: Transmission/Transmit
RX: Reception/Receive
RAT: Radio Access Technology
TRP: Transmission-Reception-Point
SCG: Secondary Cell Group

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
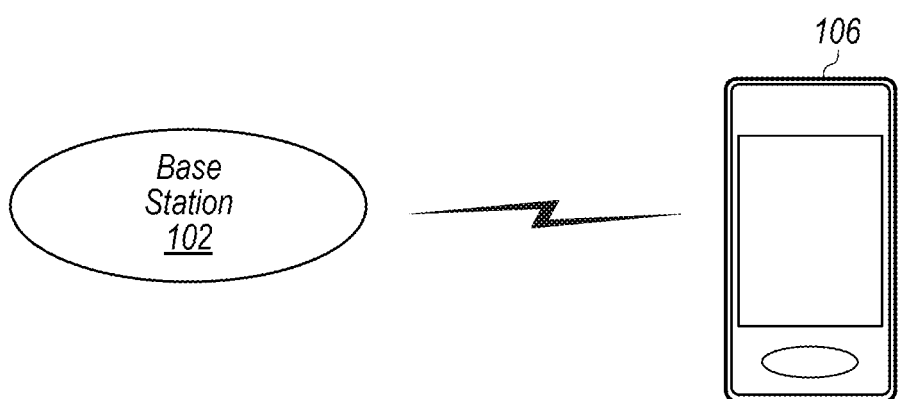
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to predict and mitigate thermal pressure in a wireless device, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
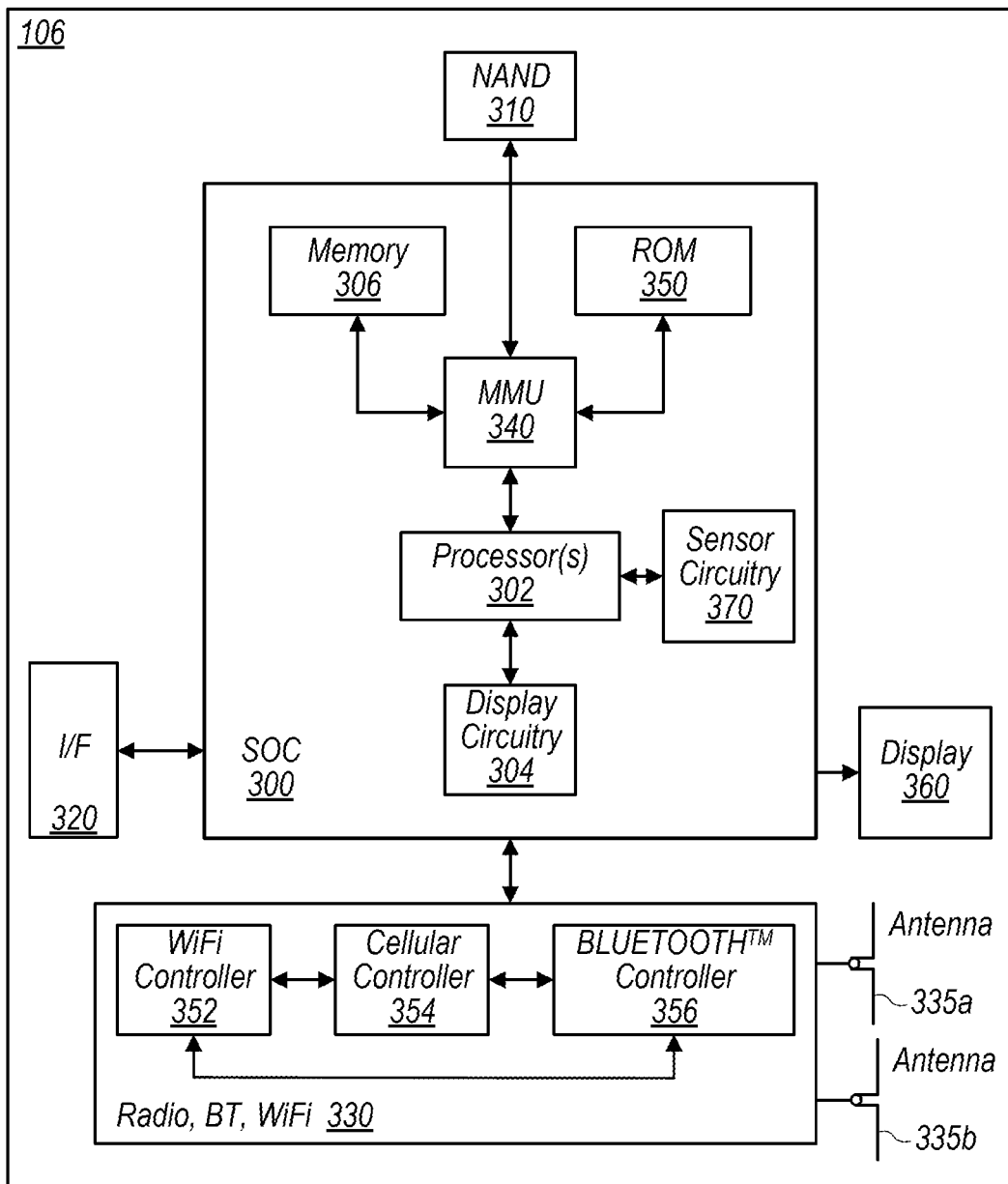
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to determine a radio access technology availability indicator to present in a wireless device, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to determine a radio access technology availability indicator to present in a wireless device according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
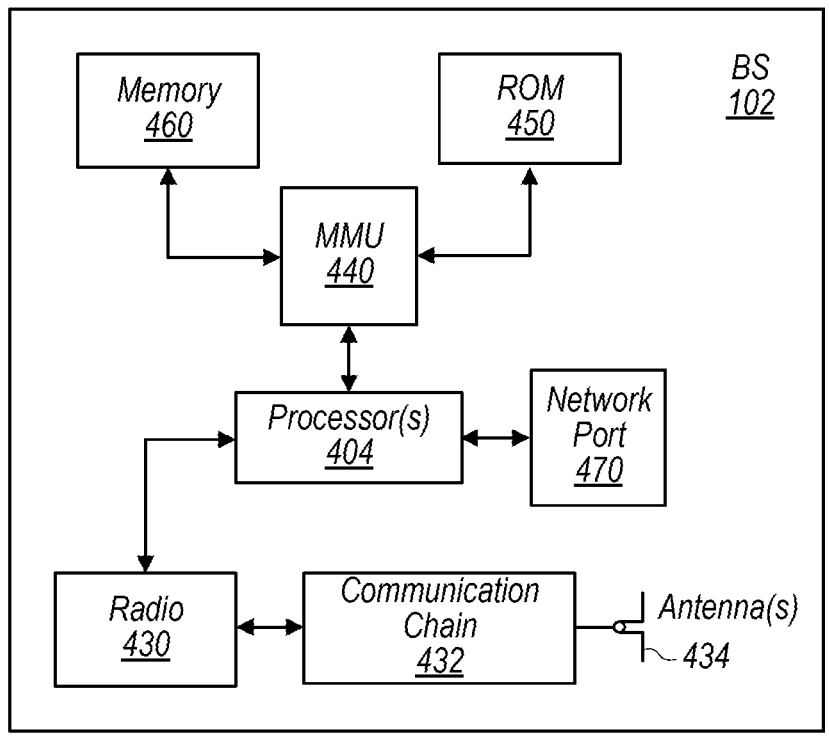
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

Figure 5:
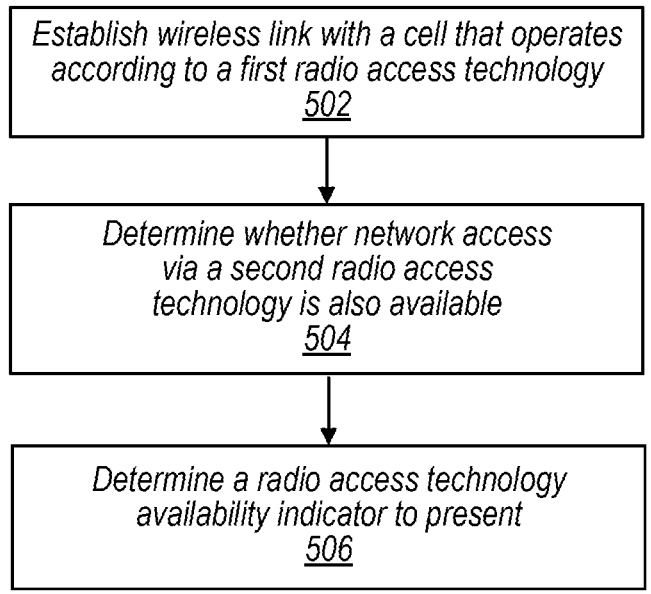
FIG. 5 is a flowchart diagram illustrating aspects of an exemplary possible method for determining a radio access technology availability indicator to present in a wireless device, according to some embodiments.
Figure 6:
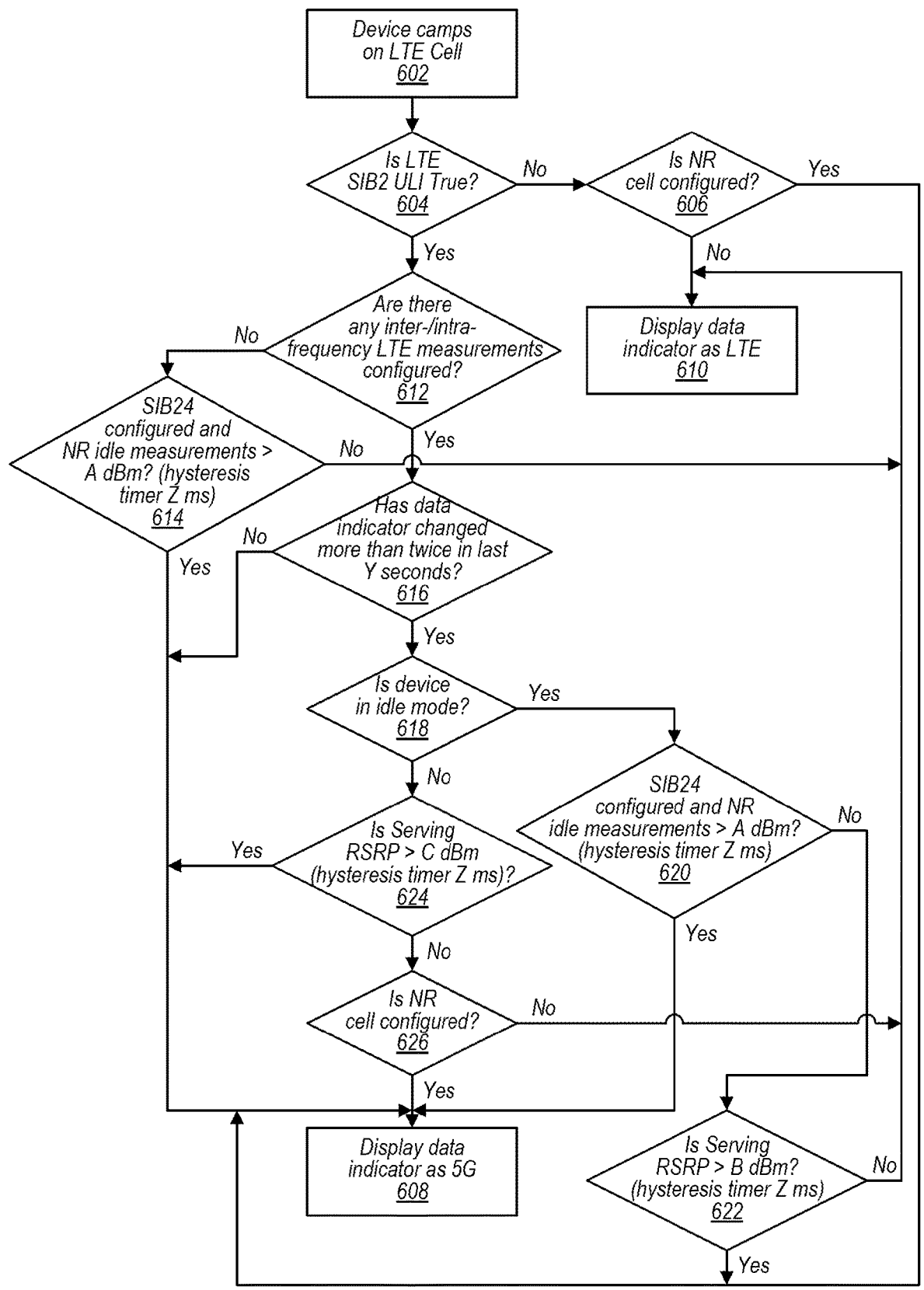
FIG. 6 is a flowchart diagram illustrating further possible aspects of such a possible method for determining a radio access technology availability indicator to present in a wireless device, according to some embodiments.

FIGS. 5-6—Determining a Radio Access Technology Availability Indicator to Present Different wireless communication technologies can have significant variation in their features and performance. For example, at least in some instances, 3GPP 5G NR cellular communication technology may support communication with higher data rates than previous cellular communication technologies.

Depending on network deployment configurations, service agreements, loading, and/or any of various other considerations, access to a cellular network via different radio access technologies may have differing availability. Thus, at certain locations and times, network access to perform data and/or other communication may be available via one or more radio access technologies but unavailable via one or more other radio access technologies.

Given the potentially differing features and performance of different radio access technologies, it may be useful to provide an indicator of one or more radio access technologies currently available for a wireless device to a user of the wireless device, e.g., via a user interface of the wireless device. For example, a visual indicator such as a symbol, icon, word, phrase, abbreviation, etc., could be displayed on a display of the wireless device, or an audio indicator such as a sound, word, phrase, etc., could be presented using a speaker of the wireless device.

Accordingly, FIG. 5 is a flowchart diagram illustrating a method for determining a radio access technology availability indicator to present in a wireless device, at least according to some embodiments. Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP, LTE, and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. The wireless link may be established via a first cell that operates according to a first radio access technology. For example, according to some embodiments, the wireless link may include a cellular link according to LTE; in such a case, the wireless device may establish a session with a mobility management entity of the cellular network by way of an eNB that provides radio access to the cellular network, at least as one possibility. As another possibility, the wireless link may include a cellular link according to 5G NR. For example, the wireless device may establish a session with an AMF entity of the cellular network by way of one or more gNBs that provide radio access to the cellular network.

At least in some instances, it may be possible for the wireless link to be established with a cell configured as part of a non-standalone 5G NR deployment. For example, the wireless device may establish a wireless link with an anchor LTE cell, which may also support establishing a wireless link with a secondary cell group (SCG) that operates according to 5G NR. Alternatively, or additionally, it may be possible for the wireless device to establish a wireless link with LTE serving cell that does not support configuration of any non-standalone 5G NR cells, and/or to establish a wireless link with a standalone 5G NR serving cell. Other types of cellular links and other configurations are also possible, and the cellular network may also or alternatively operate according to another cellular communication technology (e.g., UMTS, CDMA2000, GSM, etc.), according to various embodiments.

Establishing the wireless link may include establishing a radio resource control (RRC) connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the wireless device may determine whether access to the cellular network via a second RAT is also available to the wireless device. In some instances, the first RAT may include LTE while the second RAT may include NR. Thus, as one possible aspect of determining whether access to the cellular network via the second RAT is also available to the wireless device, the wireless device may receive system information (e.g., system information block 2 (SIB2)) that indicates whether the first cell supports configuration of a (e.g., NSA) second cell that operates according to NR. For example, if the first cell does support NSA NR operation, it may be the case that access to the cellular network via the second RAT is considered to also be available to the wireless device, possibly even if no second cell that operates according to the second RAT is currently actively configured for the wireless device.

However, in certain scenarios, it may be the case that an indication that NSA NR is supported by the first cell in such system information may not fully guarantee the availability of NR access to the network. For example, in a scenario in which handover could occur, the potential handover could be to a different LTE cell in a different frequency band that does not support configuration of a second cell that operates according to NR. As another possibility, serving cell signal strength may be too low to support NSA NR operation in a scenario in which handover is a possibility. Accordingly, it may be the case that one or more other considerations are also taken into account by the wireless device when determining whether access to the cellular network via the second RAT is available to the wireless device.

As one possible indicator of whether handover may be a possibility, the wireless device may determine whether any inter-frequency and/or intra-frequency LTE cell measurements are configured by the first cell. For example, if such measurements are configured, it may be an indication that handover between the first cell and one of the cells configured for measurement is a possibility, e.g., because of low signal strength of the first cell and/or higher signal strength of another cell.

Accordingly, if any inter-frequency and/or intra-frequency LTE cell measurements are configured, the wireless device may check whether a RAT availability indicator presented by the wireless device has changed more than a configured threshold number of times within a configured duration. Such an occurrence may be indicative of the potential for a scenario in which the wireless device has recently performed multiple handovers between one or more cells that do support NSA NR operation and one or more cells that do not support NSA NR operation.

Thus, if the RAT availability indicator presented by the wireless device has changed more than the configured threshold number of times within the configured duration, the wireless device may check the signal strength of the first cell, e.g., to determine how likely handover from the first cell is and/or whether the first cell signal strength is considered sufficient to support NSA NR operation. The signal strength check may depend on whether the wireless device is in RRC idle or RRC connected, at least according to some embodiments. For example, the signal strength of the first cell may be compared against an idle mode serving cell signal strength threshold if the wireless device is in idle mode, or may be compared against a connected mode serving cell signal strength threshold if the wireless device is in connected mode. In some instances, the connected mode serving cell signal strength threshold may be higher than the idle mode serving cell signal strength threshold. It may be the case that if the first cell supports NSA NR operation and passes the signal strength check, the wireless device determines that access to the cellular network via NR is available to the wireless device.

In some instances, the determination of whether access to the cellular network via the second RAT is available to the wireless device may also or alternatively be based at least in part on whether one or more standalone cells that operate according to the second RAT are determined to be available. For example, if the first cell does not support NSA NR operation, before determining that NR access to the cellular network is not available, the wireless device may check whether the wireless device is able to obtain access to the cellular network via one or more standalone cells that operate according to the second RAT. As another possibility, if the first cell does support NSA NR operation, but inter- and/or intra-frequency LTE measurements are configured, the RAT availability indicator presented by the wireless device has changed more than the configured threshold number of times within the configured duration, and the first cell signal strength does not pass the serving cell signal strength check (e.g., for idle or connected mode, as applicable), the wireless device may check whether access to the cellular network via one or more standalone cells that operate according to the second RAT is available.

As one possibility, such a check may make use of NR neighbor cell information provided by the first cell. For example, system information block 24 (SIB24) of an LTE cell may include neighbor information for one or more SA NR cells; in such a scenario, the wireless device may thus receive information indicating whether there are one or more neighbor cells that operate in accordance with the second RAT in a standalone manner. If there are any such cells indicated, the wireless device may perform one or more signal strength measurements for each such cell, e.g., to determine whether their signal strength is sufficient to support a wireless link between the wireless device and the cellular network. For example, the signal strength of any such cells may be compared to a signal strength threshold configured for neighbor cells that operate in accordance with the second RAT in a standalone manner. Such a check may further depend on a hysteresis timer, e.g., to avoid frequent changes in the results of the check when the signal strength is close to the signal strength threshold, if desired. It may be the case that if there are one or more SA NR neighbor cells that pass such a signal strength check, the wireless device determines that access to the cellular network via NR is available to the wireless device.

As a further possibility, in some instances, the determination of whether access to the cellular network via the second RAT is available to the wireless device may also or alternatively be based at least in part on whether a NR cell is currently actively configured for the wireless device. For example, even if the serving cell signal strength is below the threshold based on which the wireless device would otherwise assess the first cell as having sufficient signal strength to support configuring the wireless device with a NR cell, it may be possible that a NR cell is nonetheless already configured (e.g., by the first cell, as part of a dual connectivity configuration) for the wireless device. In such a scenario, the wireless device may determine that access to the cellular network via NR is available to the wireless device.

If none of the checks performed by the wireless device to determine whether access to the cellular network via the second RAT result in a determination that access to the cellular network via the second RAT is available to the wireless device, the wireless device may determine that access to the cellular network via the second RAT is not available to the wireless device. For example, in some instances, if the first cell indicates that it does not support NSA NR operation, and no SA NR cells are available with sufficient signal strength, the wireless device may determine that access to the cellular network via the second RAT is not available to the wireless device. As another possibility, if the first cell supports NSA NR operation but is determined to have insufficient signal strength for NSA NR operation or handover to a cell that may not support NSA NR operation is assessed as likely, and if no SA NR cells are available with sufficient signal strength, the wireless device may determine that access to the cellular network via the second RAT is not available to the wireless device.

Note that other conditions for determining that access to the cellular network via the second RAT is available to the wireless device or is unavailable to the wireless device, e.g., in addition to or as alternatives to those provided by way of example herein, and based on similar and/or other considerations, are also possible.

In 506, the wireless device may determine a radio access technology availability indicator to present. For example, the indicator could include an icon, a symbol, a word, phrase, or abbreviation, or any of various other possible visual indicators intended to convey a radio access technology using which the wireless device is currently capable of performing cellular communication. Alternatively, or in addition, an audio indicator (e.g., a sound, word, or phrase), and/or one or more other types of indication (e.g. vibration pattern) could be used to present the radio access technology availability indicator, if desired.

As previously noted herein, in some instances, the first RAT may include LTE and the second RAT may include NR. Thus, according to some embodiments, the wireless device may determine to present an indicator of 5G NR cellular availability when connectivity with a 5G NR cell is determined to be available, or determine to present an indicator of LTE cellular availability when connectivity with a 5G NR cell is determined to not be available and connectivity with a LTE cell is determined to be available.

Further, at least according to some embodiments, the wireless device may proceed to present (e.g., display on a screen of the wireless device) an indication of 5G NR cellular availability when it is determined to present an indication of 5G NR cellular availability, and to present (e.g., display on a screen of the wireless device) an indication of LTE cellular availability when it is determined to present an indication of LTE cellular availability.

Thus, the method of FIG. 5 may be used to determine a radio access technology availability indicator to present in a wireless device. At least according to some embodiments, such techniques may help improve user experience, e.g., by providing a more accurate indication of which cellular technology and/or cellular technology features are currently available at the wireless device, at least in some instances.

FIG. 6 illustrates further aspects that might be used in conjunction with the method of FIG. 5 if desired. It should be noted, however, that the exemplary details illustrated in and described with respect to FIG. 6 are not intended to be limiting to the disclosure as a whole: numerous variations and alternatives to the details provided herein below are possible and should be considered within the scope of the disclosure.

As previously noted herein, many wireless devices are capable of communicating using multiple radio access technologies. It is common for at least some such devices to provide a visual indicator of which RAT(s) is (are) available, e.g., to inform users of the current RAT status of those wireless devices. For example, a wireless device might display an indicator of 5G data availability in scenarios in which the device determines that 5G service is available to the device, and might display an indicator of LTE data availability in scenarios in which the device determines that LTE service is available to the device (and possibly also that 5G service is not available to the device), among various possibilities.

In certain scenarios, it may be possible for the conditions based upon which the wireless device determines which indicator to display to rapidly change, such that depending on the wireless device configuration, it could be possible for the device to frequently shift back and forth (e.g., "ping-pong") between determining to display an indicator of availability of two (or more) different RATs.

For example, one such scenario could occur when a UE is operating in stationary conditions where non-standalone (NSA) 5G network deployment is used. In such a scenario, it may be the case that an LTE cell may provide an upper layer indicator (ULI) in its system information block 2 (SIB2), which may indicate whether the LTE cell is capable of configuring a NSA 5G cell. Thus, if the UE is performing handover between multiple LTE bands with different SIB2 ULI configurations, and the UE is configured to determine whether to display an indicator of 5G data availability or LTE data availability based (e.g., primarily or exclusively) on the serving cell SIB2 ULI configuration, it may be the case that the UE data indicator displayed could flicker between 5G and LTE.

Accordingly, it may be beneficial to provide additional and/or alternative mechanisms for a UE to determine a RAT availability indicator to display (e.g., which may take into consideration any of various other possible factors), which may avoid or reduce the likelihood that the RAT availability indicator displayed by the UE ping-pongs between different RATs. Such techniques may potentially increase the accuracy of the information provided to the user via the display, and/or lower the potential for user confusion regarding which RAT(s) is (are) currently available to the UE, e.g., for data and/or other communication.

FIG. 6 illustrates aspects of one such possible algorithm for a UE to determine a radio access technology availability indicator to display. As shown, in 602, the UE may camp on an LTE cell. In 604, the UE may determine whether the LTE SIB2 ULI for the serving cell is set to true. If not (e.g., indicating that the serving cell is not capable of configuring NSA 5G NR), in 606, the UE may check whether any (e.g., standalone (SA)) 5G NR cells are configured. For example, the UE may determine if any neighbor NR cells are indicated in a system information block 24 (SIB24) provided by the serving cell, and if the NR idle measurements for one or more such cells are better than a configured threshold for such cells (e.g., "A" dBm, possibly using a hysteresis timer of "Z" ms; in some instances, A may be selected based on 3GPP specified B1 threshold). If so, in 608, the UE may determine to display an indicator of 5G data availability, and may display such an indicator accordingly. If not, in 610, the UE may determine to display an indicator of LTE data availability, and may display such an indicator accordingly.

If the LTE SIB2 ULI is set to true (e.g., indicating that the serving cell is capable of configuring NSA 5G NR), in 612, the UE may determine whether there are any inter- and/or intra-frequency LTE measurements configured by the serving cell (e.g., which may be indicative that there is some possibility of handover between LTE cells, in which case fluctuation between cells with different SIB2 ULI configurations may be more likely). If not, in 614, the UE may check whether any (e.g., SA) 5G NR cells are indicated by SIB24, and if the NR idle measurements for one or more such cells are better than the configured threshold for such cells (e.g., A dBm). If so, the method may proceed to 608, the UE may determine to display an indicator of 5G data availability, and may display such an indicator accordingly. If not, the method may proceed to 610, the UE may determine to display an indicator of LTE data availability, and may display such an indicator accordingly.

If there are any inter- and/or intra-frequency LTE measurements configured by the serving cell, in 616, the UE may determine whether the data indicator has changed more than a configured number of times (e.g., twice, or any other desired number) within a configured duration ("Y" seconds), e.g., to check whether the UE has recently performed any handovers to potentially non-NR-supporting LTE bands/cells. If not, the method may proceed to 608, the UE may determine to display an indicator of 5G data availability, and may display such an indicator accordingly.

If the data indicator has changed more than the configured number of times within the configured duration, in 618, the UE may determine whether it is in idle mode. If so, in 620, the UE may check whether any (e.g., SA) 5G NR cells are configured by SIB24, and if the NR idle measurements for one or more such cells are better than the configured threshold for such cells (e.g., A dBm). If so, the method may proceed to 608, the UE may determine to display an indicator of 5G data availability, and may display such an indicator accordingly. If not, in 622, the UE may determine whether serving cell signal strength (e.g., reference signal received power (RSRP)) is greater than a certain threshold ("B" dBm, e.g., −120 dBm, or any of various other possible values), which may be selected as being indicative of sufficient signal strength for NSA 5G data availability configured by the serving cell when operating in idle mode. If so, the method may proceed to 608, the UE may determine to display an indicator of 5G data availability, and may display such an indicator accordingly. If not, the method may proceed to 610, the UE may determine to display an indicator of LTE data availability, and may display such an indicator accordingly.

If, in step 618, it is determined that the UE is not in idle mode, in 624, the UE may determine if the serving cell signal strength (e.g., RSRP) is greater than a certain threshold ("C" dBm, which may be different (e.g., greater) than the threshold for idle mode, e.g., −116 dBm, or any of various other possible values), which may be selected as being indicative of sufficient signal strength for NSA 5G data availability configured by the serving cell when operating in connected mode. If so, the method may proceed to 608, the UE may determine to display an indicator of 5G data availability, and may display such an indicator accordingly. If not, in 626, the UE may check whether any (e.g., SA) 5G NR cells are configured by SIB24, and if the NR idle measurements for one or more such cells are better than the configured threshold for such cells (e.g., A dBm). If so, the method may proceed to 608, the UE may determine to display an indicator of 5G data availability, and may display such an indicator accordingly. If not, the method may proceed to 610, the UE may determine to display an indicator of LTE data availability, and may display such an indicator accordingly.

In the following further exemplary embodiments are provided.

One set of embodiments may include a baseband processor configured to perform operations comprising: establishing a wireless link with a cellular network via a LTE cell; receiving system information for the LTE cell, wherein the system information indicates whether the LTE cell supports non-standalone (NSA) NR operation; determining whether one or more standalone (SA) NR cells with sufficient signal strength to support data communication with the wireless device are available; determining whether data communication via NR is available to the wireless device based at least in part on whether the LTE cell supports NSA NR operation and whether one or more SA NR cells with sufficient signal strength to support data communication with the wireless device are available; and determining whether to present an indicator of LTE data availability or an indicator of NR data availability based at least in part on whether data communication via NR is determined to be available to the wireless device.

According to some embodiments, the baseband processor is further configured to perform operations comprising: determining whether any inter-frequency or intra-frequency LTE cell measurements are configured by the LTE cell, wherein determining whether data communication via NR is available to the wireless device is further based at least in part on whether any inter-frequency or intra-frequency LTE cell measurements are configured by the LTE cell.

According to some embodiments, the baseband processor is further configured to perform operations comprising: determining whether the wireless device has changed which data availability indicator to present more than a threshold number of times within a configured duration, wherein determining whether data communication via NR is available to the wireless device is further based at least in part on whether the wireless device has changed which data availability indicator to present more than the threshold number of times within the configured duration.

According to some embodiments, the baseband processor is further configured to perform operations comprising: determining whether a signal strength of the LTE cell is greater than a serving cell signal strength threshold when the system information for the LTE cell indicates that the LTE cell supports NSA NR operation, wherein determining whether data communication via NR is available to the wireless device is further based at least in part on whether the signal strength of the LTE cell is greater than the serving cell signal strength threshold.

According to some embodiments, the baseband processor is further configured to perform operations comprising: determining a radio resource control (RRC) state of the wireless device; and selecting the serving cell signal strength threshold based at least in part on the radio resource control state of the wireless device, wherein a different serving cell signal strength threshold is selected for an RRC idle state than for an RRC connected state.

Another set of embodiments may include a method, comprising: by a wireless device: establishing a wireless link with a cellular network via a LTE cell; receiving system information for the LTE cell that indicates whether the LTE cell is capable of configuring a NR cell in a non-standalone configuration; and determining whether to display an indicator of LTE availability or an indicator of NR availability based at least in part on the system information and further based on at least one additional consideration.

According to some embodiments, the system information for the LTE cell that indicates whether the LTE cell is capable of configuring a NR cell in a non-standalone configuration includes a system information block 2 (SIB2) upper layer indicator (ULI).

According to some embodiments, the method further comprises: receiving system information for the LTE cell that indicates whether the LTE cell has one or more standalone NR neighbor cells; wherein whether to display an indicator of LTE availability or an indicator of NR availability is determined further based at least in part on whether the LTE cell has one or more standalone NR neighbor cells.

According to some embodiments, the method further comprises: determining, if the LTE cell has one or more standalone NR neighbor cells, whether cell strength is greater than a cell strength threshold for each standalone NR neighbor cell; wherein whether to display an indicator of LTE availability or an indicator of NR availability is determined further based at least in part on whether cell strength for one or more of the standalone NR neighbor cells is greater than the cell strength threshold.

According to some embodiments, the system information for the LTE cell that indicates whether the LTE cell has one or more standalone NR neighbor cells includes a system information block 24 (SIB24).

According to some embodiments, the method further comprises: determining whether any inter-frequency or intra-frequency LTE cell measurements are configured by the LTE cell, wherein whether to display an indicator of LTE availability or an indicator of NR availability is determined further based at least in part on whether any inter-frequency or intra-frequency LTE cell measurements are configured by the LTE cell.

According to some embodiments, the method further comprises: determining whether the wireless device has changed whether to display an indicator of LTE availability or an indicator of NR availability more than a threshold number of times within a configured duration, wherein whether to display an indicator of LTE availability or an indicator of NR availability is determined further based at least in part on whether the wireless device has changed whether to display an indicator of LTE availability or an indicator of NR availability more than the threshold number of times within the configured duration.

According to some embodiments, the system information for the LTE cell indicates that the LTE cell is capable of configuring a NR cell in a non-standalone configuration, wherein the method further comprises: determining a radio resource control (RRC) state of the wireless device; selecting a serving cell signal strength threshold based at least in part on the radio resource control state of the wireless device, wherein a different serving cell signal strength threshold is selected for an RRC idle state than for an RRC connected state; and determining whether a signal strength of the LTE cell is greater than the serving cell signal strength threshold, wherein whether to display an indicator of LTE availability or an indicator of NR availability is determined further based at least in part on whether the signal strength of the LTE cell is greater than the serving cell signal strength threshold.

Still another set of embodiments may include a wireless device, comprising: an antenna; a radio operably coupled to the antenna; and a processor operably coupled to the radio; wherein the wireless device is configured to: establish a wireless link with a cellular network via a first cell that operates in accordance with a first radio access technology (RAT); determine whether access to the cellular network via a second RAT is also available to the wireless device; select a RAT availability indicator to present based at least in part on the wireless link with the cellular network being established via the first radio access technology and further based at least in part on whether access to the cellular network via the second RAT is determined to also be available to the wireless device; and present the selected RAT availability indicator via one or more user interface elements of the wireless device.

According to some embodiments, to determine whether access to the cellular network via the second RAT is also available to the wireless device, the wireless device is further configured to: determine whether the first cell supports configuration of a non-standalone second cell that operates in accordance with the second RAT.

According to some embodiments, if the first cell supports configuration of a non-standalone second cell that operates in accordance with the second RAT, to determine whether access to the cellular network via the second RAT is also available to the wireless device, the wireless device is further configured to: determine whether one or more inter-frequency or intra-frequency neighbor cell measurements are configured for cells that also operate according to the first RAT.

According to some embodiments, if one or more inter-frequency or intra-frequency neighbor cell measurements are configured for cells that also operate according to the first RAT, to determine whether access to the cellular network via the second RAT is also available to the wireless device, the wireless device is further configured to: determine whether the RAT availability indicator to present has changed more than a threshold number of times within a configured duration.

According to some embodiments, if the RAT availability indicator to present has changed more than a threshold number of times within a configured duration, to determine whether access to the cellular network via the second RAT is also available to the wireless device, the wireless device is further configured to: determine whether a signal strength of the first cell meets a signal strength threshold, wherein the signal strength threshold is selected based at least in part on a radio resource control (RRC) state of the wireless device.

According to some embodiments, to determine whether access to the cellular network via the second RAT is also available to the wireless device, the wireless device is further configured to: determine whether one or more neighbor cells that operate in accordance with the second RAT in a standalone manner have sufficient signal strength to support a wireless link between the wireless device and the cellular network.

According to some embodiments, the first RAT is LTE, wherein the second RAT is 5G NR, wherein determining the RAT availability indicator to present includes determining whether to present an indicator of LTE availability or an indicator of NR availability.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processor configured to cause a wireless device to perform any or all of the elements of any of the preceding examples.

Another exemplary set of embodiments may include a baseband processor configured to perform operations comprising any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor configured to perform operations comprising:
at a wireless device:
establishing a wireless link with a cellular network via a LTE cell;
receiving system information for the LTE cell, wherein the system information indicates whether the LTE cell supports non-standalone (NSA) NR operation;
determining whether one or more standalone (SA) NR cells with sufficient signal strength to support data communication with the wireless device are available;
determining whether data communication via NR is available to the wireless device based at least in part on whether the LTE cell supports NSA NR operation and whether one or more SA NR cells with sufficient signal strength to support data communication with the wireless device are available; and
determining whether to present an indicator of LTE data availability or an indicator of NR data availability based at least in part on whether data communication via NR is determined to be available to the wireless device.

2. The baseband processor of claim 1, wherein the baseband processor is further configured to perform operations comprising:
determining whether any inter-frequency or intra-frequency LTE cell measurements are configured by the LTE cell,
wherein determining whether data communication via NR is available to the wireless device is further based at least in part on whether any inter-frequency or intra-frequency LTE cell measurements are configured by the LTE cell.

3. The baseband processor of claim 1, wherein the baseband processor is further configured to perform operations comprising:
determining whether the wireless device has changed which data availability indicator to present more than a threshold number of times within a configured duration,
wherein determining whether data communication via NR is available to the wireless device is further based at least in part on whether the wireless device has changed which data availability indicator to present more than the threshold number of times within the configured duration.

4. The baseband processor of claim 1, wherein the baseband processor is further configured to perform operations comprising:
determining whether a signal strength of the LTE cell is greater than a serving cell signal strength threshold when the system information for the LTE cell indicates that the LTE cell supports NSA NR operation,
wherein determining whether data communication via NR is available to the wireless device is further based at least in part on whether the signal strength of the LTE cell is greater than the serving cell signal strength threshold.

5. The baseband processor of claim 4, wherein the baseband processor is further configured to perform operations comprising:
determining a radio resource control (RRC) state of the wireless device; and
selecting the serving cell signal strength threshold based at least in part on the radio resource control state of the wireless device, wherein a different serving cell signal strength threshold is selected for an RRC idle state than for an RRC connected state.

6. The baseband processor of claim 1, wherein said determining whether one or more SA NR cells are available comprises receiving second information from the LTE cell identifying the one or more SA NR cells.

7. A method, comprising:
by a wireless device:
establishing a wireless link with a cellular network via a LTE cell;
receiving first system information for the LTE cell that indicates whether the LTE cell is capable of configuring a NR cell in a non-standalone configuration;
receiving second system information for the LTE cell that indicates whether the LTE cell has one or more standalone NR neighbor cells; and
determining whether to display an indicator of LTE availability or an indicator of NR availability based at least in part on the first system information and further based on the second system information.

8. The method of claim 7,
wherein the first system information for the LTE cell that indicates whether the LTE cell is capable of configuring a NR cell in a non-standalone configuration includes a system information block 2 (SIB2) upper layer indicator (ULI).

9. The method of claim 7, wherein the method further comprises:
determining, if the LTE cell has one or more standalone NR neighbor cells, whether cell strength is greater than a cell strength threshold for each standalone NR neighbor cell;
wherein whether to display an indicator of LTE availability or an indicator of NR availability is determined further based at least in part on whether cell strength for one or more of the standalone NR neighbor cells is greater than the cell strength threshold.

10. The method of claim 7,
wherein the system information for the LTE cell that indicates whether the LTE cell has one or more standalone NR neighbor cells includes a system information block 24 (SIB24).

11. The method of claim 7, wherein the method further comprises:
determining whether any inter-frequency or intra-frequency LTE cell measurements are configured by the LTE cell,
wherein whether to display an indicator of LTE availability or an indicator of NR availability is determined further based at least in part on whether any inter-frequency or intra-frequency LTE cell measurements are configured by the LTE cell.

12. The method of claim 7, wherein the method further comprises:
determining whether the wireless device has changed whether to display an indicator of LTE availability or an indicator of NR availability more than a threshold number of times within a configured duration,
wherein whether to display an indicator of LTE availability or an indicator of NR availability is determined further based at least in part on whether the wireless device has changed whether to display an indicator of LTE availability or an indicator of NR availability more than the threshold number of times within the configured duration.

13. The method of claim 7, wherein the system information for the LTE cell indicates that the LTE cell is capable of configuring a NR cell in a non-standalone configuration, wherein the method further comprises:
determining a radio resource control (RRC) state of the wireless device;
selecting a serving cell signal strength threshold based at least in part on the radio resource control state of the wireless device, wherein a different serving cell signal strength threshold is selected for an RRC idle state than for an RRC connected state; and
determining whether a signal strength of the LTE cell is greater than the serving cell signal strength threshold,
wherein whether to display an indicator of LTE availability or an indicator of NR availability is determined further based at least in part on whether the signal strength of the LTE cell is greater than the serving cell signal strength threshold.

14. A wireless device, comprising:
an antenna;
a radio operably coupled to the antenna; and
a processor operably coupled to the radio;
wherein the wireless device is configured to:
establish a wireless link with a cellular network via a first cell that operates in accordance with a first radio access technology (RAT) in a non-standalone manner;
determine whether access to the cellular network via a second RAT, in a standalone manner, is also available to the wireless device;
select a RAT availability indicator to present based at least in part on the wireless link with the cellular network being established via the first radio access technology and further based at least in part on whether access to the cellular network via the second RAT is determined to also be available to the wireless device; and
present the selected RAT availability indicator via one or more user interface elements of the wireless device.

15. The wireless device of claim 14, wherein to determine whether access to the cellular network via the second RAT is also available to the wireless device, the wireless device is further configured to:
determine whether the first cell supports configuration of a non-standalone second cell that operates in accordance with the second RAT.

16. The wireless device of claim 15, wherein if the first cell supports configuration of a non-standalone second cell that operates in accordance with the second RAT, to determine whether access to the cellular network via the second RAT is also available to the wireless device, the wireless device is further configured to:
determine whether one or more inter-frequency or intra-frequency neighbor cell measurements are configured for cells that also operate according to the first RAT.

17. The wireless device of claim 16, wherein if one or more inter-frequency or intra-frequency neighbor cell measurements are configured for cells that also operate according to the first RAT, to determine whether access to the cellular network via the second RAT is also available to the wireless device, the wireless device is further configured to:
determine whether the RAT availability indicator to present has changed more than a threshold number of times within a configured duration.

18. The wireless device of claim 17, wherein if the RAT availability indicator to present has changed more than a threshold number of times within a configured duration, to determine whether access to the cellular network via the second RAT is also available to the wireless device, the wireless device is further configured to:
determine whether a signal strength of the first cell meets a signal strength threshold, wherein the signal strength threshold is selected based at least in part on a radio resource control (RRC) state of the wireless device.

19. The wireless device of claim 14, wherein to determine whether access to the cellular network via the second RAT is also available to the wireless device, the wireless device is further configured to:
determine whether one or more neighbor cells that operate in accordance with the second RAT in a standalone manner have sufficient signal strength to support a wireless link between the wireless device and the cellular network.

20. The wireless device of claim 14,
wherein the first RAT is LTE, wherein the second RAT is 5G NR,
wherein determining the RAT availability indicator to present includes determining whether to present an indicator of LTE availability or an indicator of NR availability.

\* \* \* \* \*